United States Patent [19]
Andrewartha et al.

[11] Patent Number: 5,974,514
[45] Date of Patent: Oct. 26, 1999

[54] CONTROLLING SDRAM MEMORY BY USING TRUNCATED BURST READ-MODIFY-WRITE MEMORY OPERATIONS

[75] Inventors: J. Michael Andrewartha, Plano, Tex.; Donald H. Friedberg, Breinigsville, Pa.

[73] Assignee: Hewlett-Packard, Palo Alto, Calif.

[21] Appl. No.: 08/747,320

[22] Filed: Nov. 12, 1996

[51] Int. Cl.⁶ .................................................. G06F 12/08
[52] U.S. Cl. ........................................... 711/166; 711/155
[58] Field of Search .................................... 711/105, 155, 711/166; 365/230.03, 233, 233.5

[56] References Cited

U.S. PATENT DOCUMENTS

| | | | |
|---|---|---|---|
| 5,450,130 | 9/1995 | Foley | 348/391 |
| 5,668,773 | 9/1997 | Zagar et al. | 365/233 |
| 5,673,233 | 9/1997 | Wright et al. | 365/233 |
| 5,706,247 | 1/1998 | Merritt et al. | 365/233.5 |

*Primary Examiner*—Eddie P. Chan
*Assistant Examiner*—Kevin L. Ellis

[57] ABSTRACT

In a computer system having SDRAM memory banks that use a full burst read-modify-write operation as the sole mode for conducting memory operations, by selectively truncating the memory operation, it is possible to simulate either a burst read operation or a burst write operation. In a truncated read operation, a full read portion of the memory operation is performed. The tag is read with the first data line and is updated while the remaining lines of the burst are read. The tag is written using the write portion, but then the burst operation is aborted or truncated by issuing a precharge command to abort the write after the first line of the write is completed. This saves three clock periods out of a cycle of seventeen clock periods. A truncated write operation is similar to the read operation. A full burst read is started to retrieve the tag, which is stored to the first line, but the burst is truncated after the first line has been read. A full burst write operation is started immediately after the tag read, with the last lines of the data being written first. The tag data in the first line is being updated while the last three lines are being written. Then the cycle wraps around to write the first data line, including the tag, on the last cycle of the burst write.

31 Claims, 3 Drawing Sheets

FIG. 2

| CLOCKS | -1 | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| SIMM Control Register | | | | ACT | | RD | | | | | | | | WR | | PRE | | ACT | | RD | |
| SIMM DQM Register | | | | | | | | | | | | | | | 1 | 1 | | | | | |
| SIMM CS_Register | | | | 0 | | 0 | | | | | | | | 0 | | 0 | | 0 | | 0 | |
| SIMM Data Bus | | | | | | | | R0 | R1 | R2 | R3 | | | W0 | | | | | | | |

FIG. 3

| CLOCKS | -1 | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| SIMM Control Register | | | | ACT | | RD | | | | | WR | | | | | PRE | | ACT | | RD | |
| SIMM DQM Register | | | | | | | 1 | 1 | 1 | | | | | | | | | | | | 1 |
| SIMM CS_Register | | | | 0 | | 0 | | | | | 0 | | | | | 0 | | 0 | | 0 | |
| SIMM Data Bus | | | | | | | | R0 | | | | W1 | W2 | W3 | W0 | | | | | | |

FIG. 4

| Memory Line | BYTE | | | | | | | | | | |
|---|---|---|---|---|---|---|---|---|---|---|---|
| | 0 | 1 | 2 | 3 | 4 | 5 | 6 | 7 | 8 | 9 | 10 |
| 0 | ECC | T | T | T | T | T | T | T | T | D | D |
| 1 | ECC | D | D | D | D | D | D | D | D | D | D |
| 2 | ECC | D | D | D | D | D | D | D | D | D | D |
| 3 | ECC | D | D | D | D | D | D | D | D | D | D |

FIG. 5

| CLOCKS | -1 | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| SIMM Control Register | | | | ACT | | RD | | | | | | | | WR | | | | | PRE | | ACT |
| SIMM DQM Register | | | | | | | | | | | | | | | | | | | | | |
| SIMM CS_Register | | | | 0 | | 0 | | | | | | | | 0 | | | | | 0 | | 0 |
| SIMM Data Bus | | | | | | | | R0 | R1 | R2 | R3 | | | | W0 | W1 | W2 | W3 | | | |

CONTROLLING SDRAM MEMORY BY USING TRUNCATED BURST READ-MODIFY-WRITE MEMORY OPERATIONS

BACKGROUND OF THE INVENTION

Multi-processor computer systems typically use a directory based cache. This type of cache stores cache tag information in memory along with the data information, such that whenever a read or write operation is performed in the memory, the tag is examined to determine the current state of the data information in terms of which processor is owner of the data or which processor is the last processor to update the data. Based on the type of requested memory operation, the tag is examined to determine what other events must happen, such as notifying a processor that another processor is now sharing data or that the information that the processor has in a local cache is now invalid because new data has been written. These type of events may have to occur before, or simultaneous with, the requested memory operation.

When memory is read or written, the current tag always has to be read and then updated, based on the requested memory operation, and the new updated tag has to be written into memory. These steps occur in addition to the reading or writing of the data information. The typical multi-processor system may use synchronous DRAM (SDRAM) memory, which is essentially similar to the traditional DRAM memory but includes synchronization registers that provide a simpler and more efficient interface to the memory controller.

The current generation of SDRAMs can be configured to work either in burst mode or in a single byte mode but not both modes at the same time. In a single byte mode or a byte-by-byte mode write operation, only one byte is written in each operation into each chip. In a single byte mode read operation, only one byte is read in each operation from each chip. Reading a single RAM chip provides one byte of data or 8 bits of data. Each single mode operation reads/writes a single byte from each chip in a memory module. This line of data is called a memory line. A cache line may consist of multiple memory lines. In single byte mode operations, each read or write command requires the full overhead of the command set and many single mode operations are required to operate on the full cache line.

In the burst mode, one read or write command is issued and multiple memory lines are operated on, each line in a successive clock cycle. While the overall burst operation is longer than a single mode operation, it is more efficient when operating on the entire cache line as only a single set of overhead commands is needed for a burst operation.

The basic operation of the SDRAM involves three phases of a command. The first phase is activate. The second and third phases are read/write commands and precharge command, respectively. The memory controller issues an activate command and provides a row address. Then the memory controller issues a read or write command, along with a column address. After the read or write phase is completed, the memory controller issues a precharge command which resets the RAM back to an idle state, ready for the next memory operation. In the read operation, activation occurs after a required delay to separate this operation from the previous operation, and then a read command is issued. Then there is an internal delay while the RAM gets the data and outputs it. This delay is a programmable feature called CAS latency. CAS stands for Column Address Strobe, and RAS is Row Address Strobe. These terms are traditional DRAM terms but they are also used with the SDRAM. Output of the first memory line begins, depending on CAS latency, after the read command is issued. In a burst operation, the second, third and fourth memory lines are output on the next successive clock cycles. There is a wait period called a recovery period before another command can be issued and a precharge is issued to complete the operation.

A write operation involves the activate phase, then the write command with column address is issued. If this is a burst operation, then the first memory line of data are presented along with the second, third and fourth memory lines on successive cycles.

In reading and writing the tag data, the same location of memory is being operated on, so the RAMs allow a read command and then a write command without issuing another precharge command and another activate command. This sequence would be activate, read, wait for the read data, issue the write command with the write data, then issue the precharge command to complete the sequence.

SDRAMs also have a control signal that allows for data masking, or the disabling of the data outputs, which tells the chip to disregard the data being written. This signal is called DQM. The basic DQM operation is to disable the output. After assertion of DQM, there is a latency similar to the read latency or the CAS latency. Then some clocks later the output is disabled. On a write, if DQM is asserted, the write data that would have been clocked in on that clock cycle is disregarded.

A sequence of phases of a read or write command controls the access to a RAM. First, there is an activate phase, next there is a read/write command phase, then last there is a precharge phase. The only phase where data transfer occurs is the read/write command phase. The activate phase and the precharge phase are overhead. Also, there are time delays, such as CAS or RAS accessing the RAM, and this is also part of the overhead. A burst operation mode allows more data transactions for the same overhead. For example, if a single read or write operation is being performed, there would be two clocks for activate, a clock for read, another clock for retrieving the data, another clock for the actual data, a dead clock while waiting for the precharge command, a precharge clock, then another clock before the next activate command. Thus, out of eight clock cycles, only one cycle has data actually moving. Similarly, on a write operation, there would be only one of about six cycles where data is actually transferring. A burst type operation allows for multiple data operations for the same overhead delay cost of one single mode operation. For example, the activate command would be issued, then the read command and with the read access delay on successive clocks, each memory line of a cache line would be read out of the SDRAM. Thus, all the cache line data is transferred for the same overhead, resulting in greater efficiency.

The main problem with a burst operation is that even though only a part of cache line needs to be read or written, the entire cycle must occur. If it is a read operation, then the entire operation is delayed in waiting for the rest of the burst to be read out. If it is a write operation, all of the data has to be rewritten to complete the full burst. If performing a single read or write, with a burst mode device, the overhead is actually worse than the overhead would be for a single burst or single byte operation.

There are three basic types of memory operation cycles in multiprocessor systems: read, write and read-modify-write. A read operation involves reading the tag and the data, and then updating the tag, and writing the new tag information back to the memory. A write operation involves reading the tag, updating the tag, and writing the new tag and the data back to memory. A read-modify-write operation involves, reading the tag and the data, optionally updating the data, updating the tag, and then writing the tag and the data back to memory. In the type of multi-processor system having tags in memory that have to be kept up-to-date, every memory access is effectively a read-modify-write. The only issue is how much of the data is read and how much of the data is written. The simplest approach is to make every cycle a read-modify-write.

FIG. 5 shows the sequence of events for a read-modify-write cycle. There is an activate 510 and an idle 511 or a dead clock period while the memory prepares for the next command. Then there is the read command 520, another dead clock period 521, then four cycles of read data 522 being transferred. A dead period 523 for recovery from the read, and another period 524 for waiting for propagation through the data bus pipeline. Next a write command 530 is issued with four cycles of data 531, which is followed by another dead clock period 532. Lastly, the precharge 540 is issued to prepare for the next cycle, followed by another dead period 541. Then the device is ready for the next activate 550. This total time period is seventeen clock periods from one activate 510 to the next activate 550. In previous systems that used traditional DRAMs, it was possible to do a burst read effectively by doing a column access and write the tag, or read only the tag and do the write of new a tag and data, without having to do a full burst read and a full burst write. But because of synchronous DRAMs, which greatly simplifies the interface with the memory controller, the problem of having to do full burst read-modify-write cycles exists, whereas the previous systems do not have that problem.

In summary, the problem to be solved is when using a burst mode with a synchronous DRAM, a full burst read-modify-write operation of all the memory lines must be performed whenever a read or write is necessary. For example, if the system has four memory lines and a read is desired, three clocks are wasted writing three memory lines. (The memory line with the tag must be updated). Similarly for a write, three clock periods are wasted waiting for the rest of the read burst when the data is just going to be over written. (The memory line with the tag must be read).

It is therefore desirable to design a system using a SDRAM which operates in the burst mode, but which is efficient in situations where less than all of the memory lines in a block must be accessed during one clock cycle.

SUMMARY OF THE INVENTION

The inventive method and system reduces the overhead in reading and writing tag and data by truncating or aborting read or write operations. In a truncated read operation, a full burst read is performed and the tag is read in the first data line and is updated while the remaining lines of the burst are read. The tag is written using the full burst operation, but then the burst operation is aborted or truncated by using an abort write feature of the SDRAM. This feature is effectively a precharge to abort the write after the first line of the write is completed. This saves three clock periods out of a cycle of seventeen clock periods.

A truncated write operation is similar to the read operation. A full burst read is started to retrieve the tag, which is stored to the first line, but the burst is truncated after the first word has been read. A full burst write operation is started immediately after the tag read, with the last three memory lines of the data being written first. The tag data is being updated while the last three lines are being written. Then the cycle wraps around to write the first data line, including the tag, on the last cycle of the burst write.

A technical advantage of the invention is to increase the available through-put of the memory and decrease memory access latency by removing unnecessary clock cycles from read or write operations, which are present in a full burst read-modif-write operation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 depicts a timing diagram showing the inventive truncated read operation;

FIG. 3 depicts a timing diagram showing the inventive truncated write operation;

FIG. 4 depicts the organization of the memory cache lines; and

FIG. 5 depicts a timing diagram showing a full burst read-modify-write operation.

DESCRIPTION OF THE PREFERRED EMBODIMENTS

Figure 1:
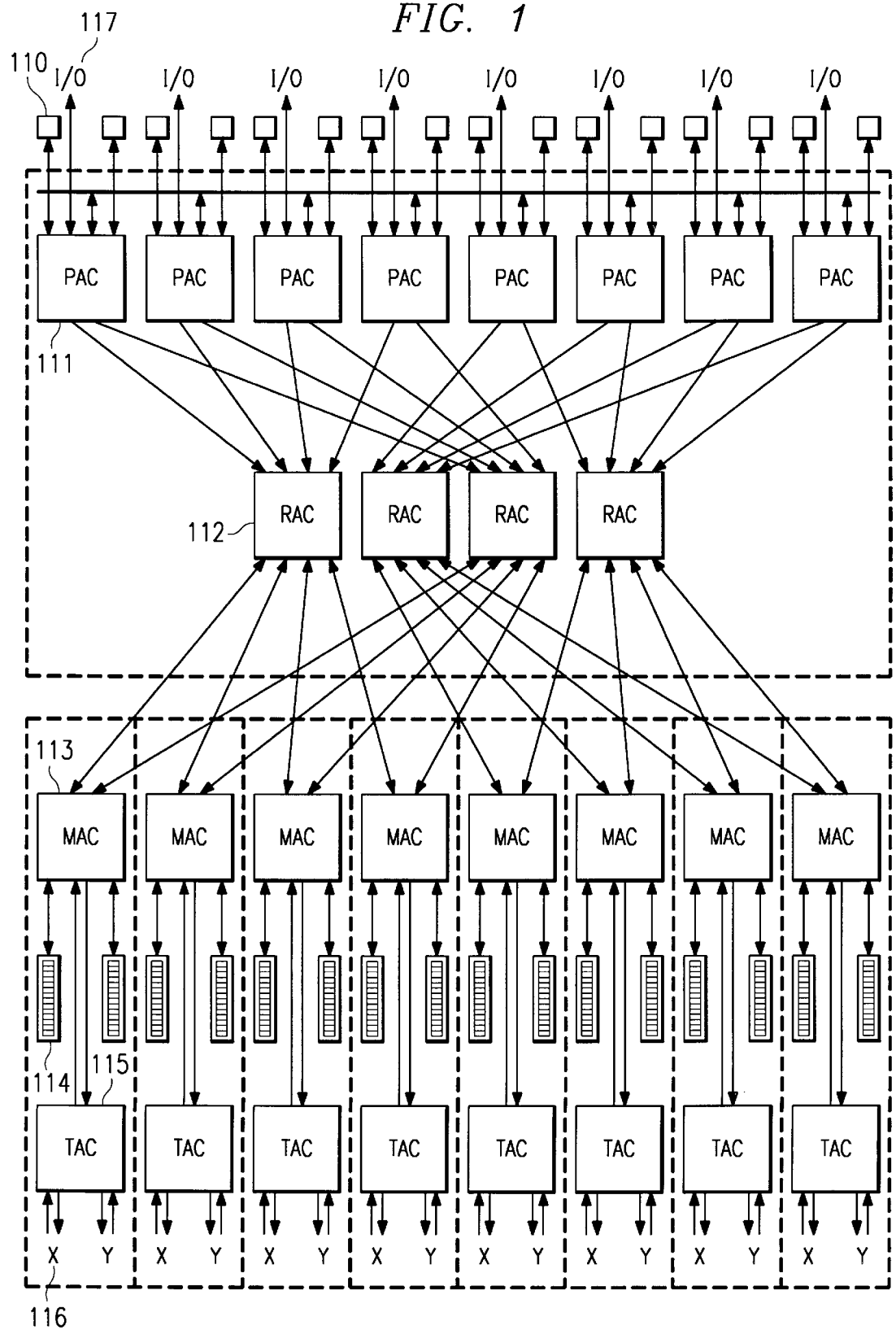
FIG. 1 depicts a single node of a multi-node, multi-processor system that uses the inventive SDRAM control.

FIG. 1 depicts a single node of a multi-node, multi-processor computer system. The overall system may have a plurality of the nodes shown in FIG. 1.

Each node, in the embodiment shown, can support up to sixteen processors 110. These processors are connected to processor agent chips or PACs 111. The function of each PAC 111 is to transmit requests from its associated processors 110 through cross bar router chips (RAC) 112 to the memory access chips (MAC) 113 and then forward the responses back to the requesting processor. Each PAC 111 has an input/output (I/O) subsystem 117. Each MAC 113 controls access to its associated coherent memory 114. When a processor 110 generates a request to access memory (or other resource), the associated PAC 111 sends the request through the proper RAC 112 to a MAC 113. If the request is destined for memory 114 on the local node, MAC 113 accesses the memory attached to it. If the request is destined for memory on another node, MAC 113 forwards the request to TAC 115. TAC 115 is the interface between the node and an SCI ring 116. TAC 115 is also known as a toroidal access chip or a SCI controller. The SCI rings 116 (not shown) interconnect the nodes in the multi-node system.

Each MAC 113 is connected to four banks of memory 114 (only two are shown for simplicity). Each bank of memory has four dual in-line memory module boards (DIMM). Each DIMM (not shown) has two rows of SDRAMs. A row of SDRAMs is eighty-eight bits wide. The row comprises eleven SDRAMs.

FIG. 4 shows the organization of the cache lines in memory. The organization of tag and data within the cache is eight bytes of tag, thirty-two bytes of cache data, and four bytes of error correction code (ECC). The first memory line 410, includes the eight tag bytes 411, two bytes of data, 412, 413 and one byte of ECC 414. Each successive memory line, has ten bytes of data 415 and one byte of ECC 416. ECC is used for error detection and correction.

The organization of these bytes is directly mapped to the organization of the SDRAMs on the DIMM. Each SDRAM on the DIMM provides one column of bytes shown in FIG. 4. Each SDRAM provides four bytes on a full burst read or receives four bytes on a full burst write and those bytes correspond to each row within a column in FIG. 4.

To read or write the tag data, the first memory line 410 of the four memory lines, must be read or written. Each of the SDRAMs in a row of SDRAMs on the DIMM receives the same command and control signals in parallel. When SDRAM is read, all SDRAMs are read on the DIMM. When one SDRAM is written, all SDRAMs are written on the DIMM in a bank. The memory is organized so that the burst length is four. If the SDRAM is instructed to read, each SDRAM is going to output four bytes of data. All the SDRAMs that were being accessed in parallel are combined to form a memory line which is 10 bytes of memory which can be tag or data. A full burst read of four lines provide thirty-two bytes of data and eight bytes of tag. A read command is issued, after the SDRAM's internal delay, one memory line is read out on each of four consecutive clock cycles. When a write command is issued, data is written on four consecutive clock cycles.

There are times that the system needs to do full read-modify-write, where the tag is read, all of the data is read, some or all of the data is updated, the tag is updated and the tag and data are full burst written.

As discussed above, FIG. 5 shows this sequence of the read-modify-write that the SDRAM performs. However, there are many times that a full read-modify-write operation does not have to be performed and thus, it is unnecessary to use that much time for performing a read and write of full memory cache.

FIG. 2 depicts the timing of a truncated read-modify-write operation that allows for just the read portion. First an activate command 210 is issued, with a one clock wait 211. Next a read command 220 is issued, followed by a one clock wait 221, required by SDRAM delay specifications. This implementation uses a CAS latency of two. So two clock cycles later, the first data line 222 is read out, which has the tag data. The tag is delivered across the memory board to the MAC and the MAC starts calculating the new tag state while the rest of the data line is reading. So on four successive clock cycles 222, four of the memory lines of the cache line are read. There is a one clock cycle of delay 223, while the data propagates to the MAC through the registers and wire delay. One clock 224 is required to turn the data bus around. Then the MAC issues a write command 230 with the tag data 231 and then follows that immediately with a precharge command 240.

The operation of SDRAMs is that if precharge is issued before a write command has completed, it aborts the write and goes straight to the precharge. The sequence that the SDRAM sees is an activate 210, a read 220, a full burst of read 222 coming in, then a write 230 with the first data line 231. On the next clock cycle, the DQM is asserted to tell the RAM not to write the next data. One clock later, the precharge 240 is issued, which aborts the write and the DQM is also asserted on that cycle just to meet the RAM's input requirements. Then one dead clock period 241 later the system is ready for another activate 250. So the time period from one activate 210 to the next activate 250 is 14 clock periods whereas on a full read-modify-write cycle has 17 clock period requirements. Thus, 3 out of 17 clock cycles are saved, or about 18%.

The time it takes to read a tag, update the tag and write the new tag is fixed within the MAC based on the pipelining and logic involved in the MAC coherency controller state machine. In terms of the SDRAM's point of view, it always will have six clock cycles between reading a tag and writing a tag. So in this case, looking at FIG. 2, there is reading the first memory line 222 and then 3 clocks of reading the rest of the burst, two idle clocks 223, 224 and then the write tag 230 so that a 6 cycle delay is preserved. On the read-modify-write cycle depicted in FIG. 5, the exact same timing is present. As far as starting the write cycle, with respect to the read cycle, the timing is the same in FIG. 2 and FIG. 5.

FIG. 3 depicts the timing of a truncated read-modify-write operation that allows for just the write portion. First, an activate command 310 with the row address and two clocks later the read command 320 with the column address is given. On the next clock cycle, DQM 323 is asserted for the next three clock cycles. Previously, it was described that DQM has a two clock latency similar to the read latency. So two clocks after the read, the first memory line 332 is read, which includes the tag data out of the RAM, and then because DQM was asserted, output drivers of the SDRAM are turned off on the next two cycles. The write command is issued after two dead clocks, and the four memory lines are written. So that three clocks after the first memory line 322 is read out and the write command 330 is issued to the SDRAM. However, in the truncated write, the address bits are controlled so that the write burst is started at the second memory line 322. So the second, third and fourth memory lines are written and then the first memory line 331 with the tag data is written. Thus, the timing relationship between the tag read and the tag write is the six clock delay, as in FIGS. 2 and 5.

The MAC reads the tag as soon as the tag input is present at the MAC. The MAC starts writing the data on the next clock cycle. It starts writing line 1, line 2, line 3 and then by the time it is ready to write line 0, at the end of the burst, the updated tag is available, so the tag line is fed into the output stream.

The read is issued and then, the write is issued before all the data had time to come out. This aborts the read operation. Because of the pipelining of DQM, the read output is squashed by asserting DQM. The bus from the RAM out to the register buffer on the board has to be idled between a read and a write. Having two things trying to output at the same time causes contention, which may destroy parts. Thus, the bus must go idle before turning around and writing the next data. This is accomplished by squashing the read data with DQM.

Therefore, counting clocks from one activate 310 to the next activate 350, the cycle flows as follows: one clock to activate 310, one clock delay 311, one clock to issue the read command 320, one clock delay 323, one clock to read the tag data 322, two clocks delay, four clocks for a full burst write with the wrap around of the tag data being written last, one cycle of delay, a precharge command 340, one cycle of delay, and the next activate command 350. The time form activate to the next activate is 14 clocks. Comparing that to the full read-modify-write of FIG. 5, where it took 17 cycles, the inventive cycle saves 3 clock periods.

The DQM signal disables the output on the SDRAM. DQM is used to override a portion of a read or write command and this feature used to save time by not doing full read or write operations. DQM is asserted by the MAC.

The SDRAM specification refers to its data pins as DQs, wherein Q is the output of a register and D is the input of the register. So a single pin that is both an input and an output is a DQ pin. When the pin is receiving data, the pin is a D. When the pin is writing data, the pin is a Q. The M in DQM stands for mask. So DQM is a way to mask data being read or being written. If performing a read operation and DQM is asserted, the DQM signal turns off the output driver of the SDRAM. The SDRAM still cycles through the burst, but it does not actually drive the bus on that particular clock period.

Thus, by asserting DQM, the data is masked off a read operation, and the RAM is still sequencing through its burst. So, to mask only one byte of the burst from a RAM, DQM would be asserted on the cycle preceding the desired mask cycle by two clock cycles. In the invention, DQM is used for masking off the second, third and fourth memory lines from all the SDRAMs. So, after the first memory line, which contains the tag data is read, for the next three cycles DQM is asserted so that the second, third and fourth memory lines of the burst are disabled. This allows the issuance of a write command sooner. The timing is shorter in this case than it would be in the full read-modify-write case by three cycles because the data bus can be turned around while the RAM is finishing the burst read.

During a write operation, the DQM instructs the RAM to ignore the data at its inputs. So if a write command is issued and DQM is asserted, the RAM is not going to write data to that location during the burst. So, after the first memory line, which contains the tag data is updated and written, then on the next cycle DQM is asserted. Thus, the first line is written, but not the second line. However, DQM does not need to be asserted for the full three cycles, because the read-modify-write operation can be aborted with a precharge at the time slot of the third memory line. DQM is asserted at that cycle with the precharge command, because as the precharge is read into the RAM, the RAM is still performing the write command and thus, still looking for data. So the DQM tells the RAM to ignore data on this cycle and the precharge aborts or truncates the current burst memory operation.

Although the present invention and its advantages have been described in detail, it should be understood that various changes, substitutions and alterations can be made herein without departing from the spirit and scope of the invention as defined by the appended claims.

What is claimed is:

1. A method for truncating a read portion of a read-modify-write memory operation, the memory operation being performed on a plurality of memory lines, a first memory line of the plurality of memory lines having tag data which describes a current state of data stored in the remaining memory lines, the method comprising the steps of:

issuing an activation command to initiate the memory operation;

issuing a read command;

reading the first memory line;

asserting a mask signal to block reading of the remaining memory lines;

updating the tag data which was read from the first memory line;

issuing a write command;

writing the remaining memory lines;

writing the first memory line with the updated tag data after the step of writing the remaining memory lines; and issuing a precharge command to complete the memory operation.

2. A method for truncating a write portion of a read-modify-write memory operation, the memory operation is performed on a memory cache of a plurality of memory lines, a first memory line of the plurality of memory lines has tag data which describes a current state of data stored in the remaining memory lines, the method comprising the steps of:

issuing an activation command to initiate the memory operation;

issuing a read command;

reading the first memory line;

reading the remaining memory lines;

updating the tag data which was read from the first memory line;

issuing a write command;

writing the first memory line with the updated tag data after the step of reading the remaining memory lines;

asserting a mask signal to block writing of a second memory line of the plurality of memory lines; and issuing a precharge command after the step of asserting a mask signal to truncate the memory operation and block the writing of the remaining lines.

3. A method for truncating a read portion of a read-modify-write memory operation, the memory operation being performed on a memory cache of a plurality of memory lines equal to the burst length of a particular memory, a first memory line of the plurality of memory lines having tag data which describes a current state of data stored in the remaining memory lines, the method comprising the steps of:

reading the first memory line;

asserting a mask signal to block reading of the remaining memory lines;

updating the tag data which was read from the first memory line;

writing the remaining memory lines; and writing the first memory line with the updated tag data after the step of writing the remaining memory lines.

4. The method of claim 3, wherein:

the method for truncating the memory operation shortens the memory operation by a number of clock cycles, whereby the number of clock cycles is equal to the burst length minus one.

5. The method of claim 3, wherein:

the plurality of memory lines is four memory lines;

the first memory line comprises 8 bytes of tag data, and 2 bytes of data; and each of the three remaining memory lines comprises 10 bytes of data.

6. The method of claim 5, wherein:

each memory line further comprises one byte of error correction code.

7. The method of claim 6, wherein:

each memory line is formed from a plurality of SDRAMs.

8. A method for truncating a write portion of a read-modify-write memory operation, the memory operation is performed on a memory cache of a plurality of memory lines equal to the burst length of a particular memory, a first memory line of the plurality of memory lines has tag data which describes a current state of data stored in the remaining memory lines, the method comprising the steps of:

reading the first memory line;

reading the remaining memory lines;

updating the tag data which was read from the first memory line;

writing the first memory line with the updated tag data after the step of reading the remaining memory lines;

asserting a mask signal to block writing of a second memory line of the plurality of memory lines; and issuing a precharge command after the step of asserting a mask signal to truncate the memory operation and block the writing of the remaining lines.

9. The method of claim 8, wherein:

the method for truncating the memory operation shortens the memory operation by a number of clock cycles, whereby the number of clock cycles is equal to the burst length minus one.

10. The method of claim 9, wherein:

the plurality of memory lines is four memory lines;

the first memory line comprises 8 bytes of tag data, and 2 bytes of data; and each of the three remaining memory lines comprises 10 bytes of data.

11. The method of claim 10, wherein:

each memory line further comprises one byte of error correction code.

12. The method of claim 11, wherein:

each memory line is formed from a plurality of SDRAMs.

13. A computer system having SDRAM memory chips that use a full burst read-modify-write operation as a mode for conducting memory operations, the computer system comprises:

means for issuing commands to the memory banks; and means for selectively truncating the memory operation to simulate either a burst read operation or a burst write operation, as directed by the processor.

14. The computer system of claim 13, wherein:

the full burst read-modify-write operation is the sole and only mode for conducting memory operations.

15. The computer system of claim 13, wherein a plurality of memory lines form a cache line, a first memory line of the cache line has tag data which describes a current state of data stored in the remaining memory lines of that cache line, and the means for selectively truncating the memory operation is directed to simulate a burst read operation of the cache line by truncating the write portion of the operation, the means for selectively truncating the memory operation including:

means for asserting of a DQM mask signal after writing the first line; and means for issuing a precharge command on a next clock cycle to truncate the remaining memory lines of the burst.

16. The computer system of claim 15, wherein:

the means for selectively truncating the memory operation shortens the memory operation by a number of clock cycles, whereby the number of clock cycles is equal to the burst length minus one.

17. The computer system of claim 15, wherein:

a number of clock cycles between reading the first memory line and writing the first memory line of the truncated memory operation is equal to a number of clock cycles between reading the first memory line and writing the first memory line in the full burst read-modify-write operation.

18. The computer system of claim 13, wherein a plurality of memory lines form a cache line, a first memory line of the cache line has tag data which describes a current state of data stored in the remaining memory lines of that cache line, and the means for selectively truncating the memory operation is directed to simulate a burst write operation of the cache line by truncating the read portion of the operation, the means for selectively truncating the memory operation including:

means for asserting a DQM mask signal after reading the first memory line;

means for issuing a write command on a next possible clock cycle after asserting the DQM signal; and means for writing the first memory line the last cycle of the write portion of the memory operation.

19. The computer system of claim 18, wherein:

the means for selectively truncating the memory operation shortens the memory operation by a number of clock cycles, whereby the number of clock cycles is equal to the burst length minus one.

20. The computer system of claim 18, wherein:

a number of clock cycles between reading the first memory line and writing the first memory line of the truncated memory operation is equal to a number of clock cycles between reading the first memory line and writing the first memory line in the full burst read-modify-write operation.

21. The computer system of claim 13, wherein:

the plurality of memory lines is four memory lines;

the first memory line comprises 8 bytes of tag data, and 2 bytes of data; and each of the three remaining memory lines comprises 10 bytes of data.

22. The computer system of claim 21, wherein:

each memory line further comprises one byte of error correction code.

23. The computer system of claim 22, wherein:

each memory line is formed from a plurality of SDRAMs.

24. A method for shortening the memory operation cycle in a processor system using SDRAM and using tag data to describe a current state of data stored in the SDRAM, the method comprising the steps of:

issuing a burst activate command to the SDRAM where the burst command is to effect several identified lines of the SDRAM within the burst cycle;

updating the tag data;

activating data within the burst cycle with respect to a certain number of the burst command identified lines of the SDRAM; and selectively inhibiting activation within the burst cycle with respect to a certain number of the burst command identified lines of the SDRAM.

25. The method set forth in claim 24 wherein said selectively inhibiting step includes the step of:

asserting the DQM input of the SDRAM.

26. The method set forth in claim 24 further comprising the steps of:

cycling through all preset operations of each burst cycle without regard to whether or not activation with respect to certain lines is inhibited.

27. The method set forth in claim 24 wherein activation can be either a read or a write operation.

28. The method set forth in claim 24 wherein the activated lines are one and the inhibited lines are the remainder of the identified lines in the burst cycle.

29. The method set forth in claim 28 wherein said one activated line is the first line of the identified lines.

30. A method for shortening the memory operation cycle in a SDRAM memory system in which blocks of data are stored in a block spanning several lines of the memory and where tag information is associated with each of such data blocks, the method comprising the steps of:

activating a read-modify-write burst cycle with respect to a selected data block, where the burst cycle would require t clock periods to execute the full cycle; and inhibiting selected memory line activations, where the number of lines that are inhibited is 1 so as to reduce the number of burst cycle clock periods to t−1.

31. The method set forth in claim 30, wherein said inhibiting selected memory line activations step includes the step of:

asserting a DQM input of the SDRAM memory system.

\* \* \* \* \*